UNITED STATES PATENT OFFICE.

BURRITT S. LACY, OF SEWAREN, NEW JERSEY, ASSIGNOR TO THE ROESSLER & HASSLACHER CHEMICAL COMPANY, OF NEW YORK, N. Y., A CORPORATION OF NEW YORK.

PROCESS OF MANUFACTURING ETHYL CHLORID.

1,242,208.      Specification of Letters Patent.      Patented Oct. 9, 1917.

No Drawing.      Application filed July 21, 1914. Serial No. 852,164.

*To all whom it may concern:*

Be it known that I, BURRITT S. LACY, a citizen of the United States, and a resident of Sewaren, in the county of Middlesex and State of New Jersey, have invented new and useful Improvements in Processes of Manufacturing Ethyl Chlorid, of which the following is a specification.

My invention relates to a process for the manufacture of ethyl chlorid which I am able to carry on practically without decomposition losses or formation of undesirable by-products. In Reissue No. 14,105 issued April 11, 1916, for the manufacture of methyl chlorid I have described a process which consists essentially of the use of a very large excess of methane over chlorin in the reaction mixture employed, by which a smooth reaction, and restriction of the product to HCl and $CH_3Cl$ may be effected.

I am aware that there are descriptions of experiments for the manufacture of ethyl chlorid by acting with chlorin on ethane; so for instance Schorlemmer refers in his well known work on ethylchlorid (*C. R.* 58, 703) to the reaction between equal volumes of ethane and chlorin, but states, as far as yields are concerned, that a mixture of chlorids is generated. Darling, *Ann. der Ch.* 150, 216 and subsequently others, repeated Schorlemmer's experiments and they state that ethyl chlorid was the prevailing substance among the obtained chlorin products; from the details as stated by same it appears as certain that the yield of ethyl chlorid was about 60% which did not warrant the operation of this process on an industrial scale.

This fact was universally acknowledged for in the text book of Richter, *Chemie der Kohlenstoffverbindungen*, 1897, page 144, there is said: "For the manufacture of alkylhalids the method of substitution is not suitable as always mixtures of compounds, and with the higher members of the series isomeric compounds are generated."

It could, therefore, hardly be supposed that the so-called "substitution" method would be amenable for the industrial generation of monochlorids of higher hydrocarbons, especially to allow chiefly the production of ethyl chlorid, all the more as it is evident to any worker in this particular art that ethane displays great susceptibility to thermal decomposition with ample deposition of carbon.

I have, however, found in the cases of ethane that the use of a large excess during chlorination according to the method described in Reissue No. 14,105 above referred to has the desired effect both of preventing decomposition and of restricting the chlorhydrocarbon produced to monochlorethane.

The following example illustrates the operation of my process, in which I proceed as follows:—

A mixture of, for example, eight volumes ethane which may contain the usual moisture carried by gases stored over water and one volume chlorin gas are passed into a heated reaction vessel composed of or lined with a material, such as silica, earthenware, or brick, which neither is appreciably attacked by the chlorin nor causes separation of carbon from the hydrocarbon, the reaction vessel being maintained at a temperature in the neighborhood of 300°–550° C. The reaction velocity increases considerably with rising temperature. From the reaction vessel the off-gas, consisting substantially of HCl, $C_2H_5Cl$ and excess $C_2H_6$, is passed through a water absorption system arranged on the counter current principle; a strong solution of HCl leaves the system at the bottom, while the off-gas consists of $C_2H_5Cl$ and excess $C_2H_6$.

The off-gas from the water absorption is next subjected to combined pressure and cooling in order to separate out the $C_2H_5Cl$. The off gas is for example compressed to about eight atmospheres pressure, and then after drying, is cooled while in the compressed state to about −20° C. Nearly all of the $C_2H_5Cl$ is thus separated out in the liquid state, while the excess $C_2H_6$ passes on, and after fresh admixture with additional $C_2H_6$ and chlorin equivalent to what has reacted, is again passed into the original reaction vessel. A less degree of pressure and a lower temperature, or a greater degree of pressure and a higher temperature, may of course be used to accomplish the same result, though I prefer to use the conditions before mentioned, which cause a satisfactory separation of $C_2H_5Cl$ without at the same time liquefying the $C_2H_6$ (which requires about fourteen atmospheres to liquefy at −20°).

I have further found that various other hydrocarbons including benzol and other aromatic hydrocarbons may be similarly treated, the details of, for example, reaction temperature, and exact method of separation of the reaction products being naturally varied in the individual cases.

What I claim is:—

1. The process of manufacturing ethyl-chlorid, consisting in mixing chlorin gas with a large excess of ethane and causing the mixture to react at high temperature.

2. The process of manufacturing ethyl-chlorid, consisting in mixing chlorin gas with a large excess of ethane, and heating the mixture to a temperature ranging approximately from 300°–550° C.

3. The process of manufacturing ethyl-chlorid, consisting in mixing chlorin gas with a large excess of moisture-containing ethane, and heating the mixture to a temperature not exceeding approximately 550° C.

4. The process of manufacturing ethyl-chlorid, consisting in mixing chlorin gas with a large excess of ethane, causing the mixture to react at a high temperature and separating the ethyl-chlorid from the reaction products.

5. The process of manufacturing ethyl-chlorid, consisting in mixing chlorin gas with a large excess of ethane, exposing said gas mixture to a temperature of about 300°–550° C., washing the obtained reaction gases with water to remove the hydrochloric acid gas, drying the remaining gases and separating the ethyl-chlorid from the unused ethane by means of suitable cold and pressure.

6. The process of manufacturing ethyl-chlorid, consisting in mixing chlorin gas with not less than about three times its volume of ethane, exposing said gas mixture to a temperature of approximately 300–550° C. washing the obtained reaction gases with water to remove the hydrochloric acid gas, drying the remaining gases, and separating the ethyl-chlorid from the unused ethane by compressing the mixture to a pressure not exceeding about fourteen atmospheres and cooling the mixture in the compressed state to about —20° C.

7. The process of manufacturing ethyl-chlorid, consisting in mixing chlorin gas with not less than about three times its volume of ethane, exposing said gas mixture to a temperature of approximately 300–550° C., washing the obtained reaction gases with water to remove the hydrochloric acid gas, separating the ethyl-chlorid from the unused ethane by compressing the mixture to a pressure not exceeding about fourteen atmospheres, drying the gas mixture while in the compressed state and cooling the mixture in the compressed state to about —20° C.

In testimony whereof I have signed this specification in the presence of two subscribing witnesses.

BURRITT S. LACY.

Witnesses:
CATHERINE A. COSTELLO,
OTTO K. ZWINGENBERGER.